Figure 3:
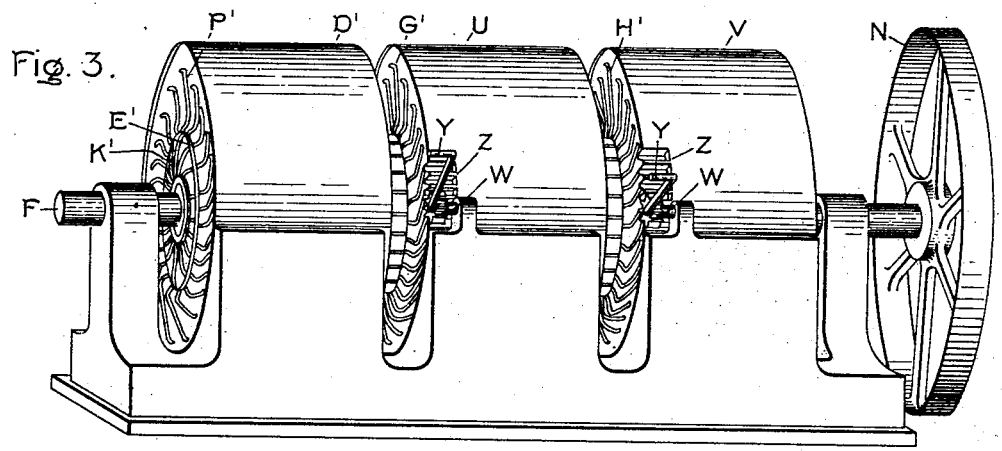

No. 714,639. Patented Nov. 25, 1902.
A. G. DAVIS.
METHOD OF PRODUCING MULTIPHASE CURRENTS FROM SINGLE PHASE CURRENTS.
(Application filed Apr. 25, 1902.)
(No Model.)  2 Sheets—Sheet 1.
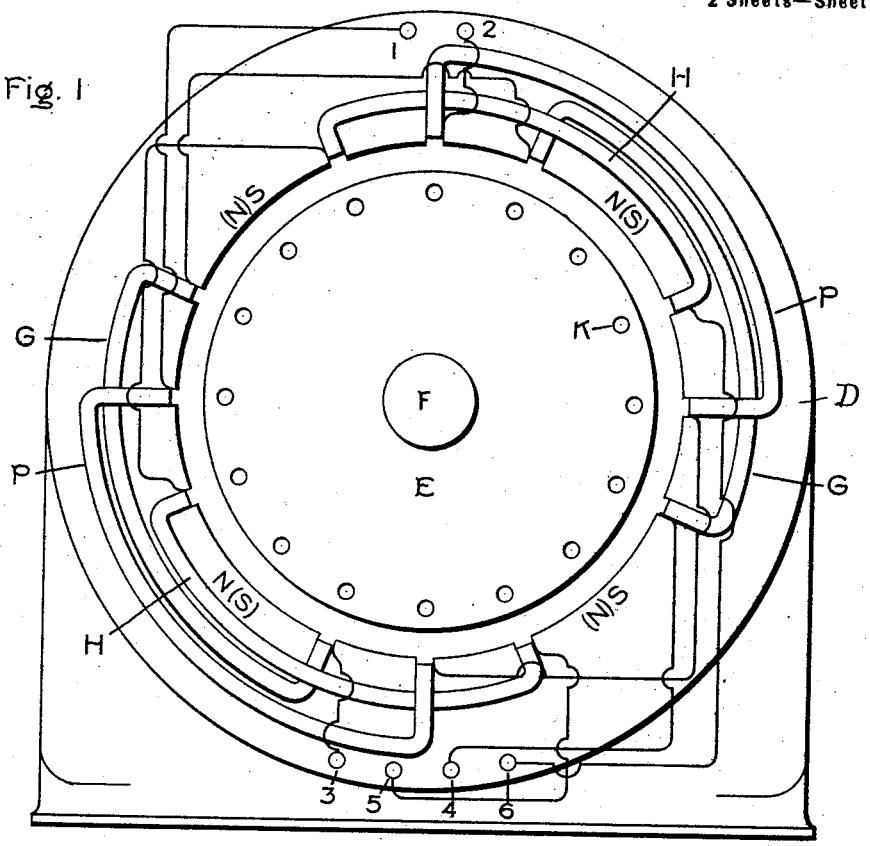
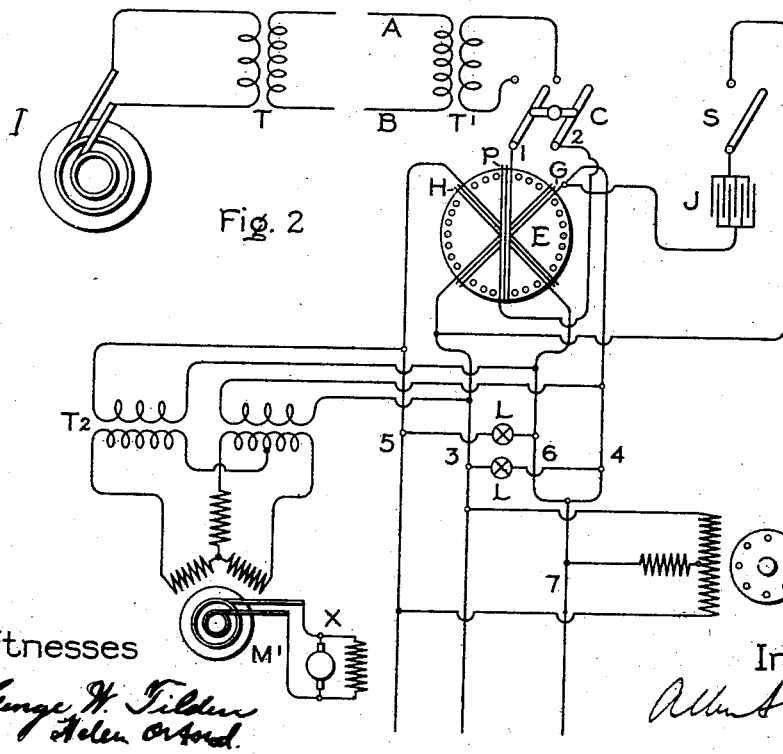
Witnesses
Inventor No. 714,639. Patented Nov. 25, 1902.
A. G. DAVIS.
METHOD OF PRODUCING MULTIPHASE CURRENTS FROM SINGLE PHASE CURRENTS.
(Application filed Apr. 25, 1902.)
(No Model.) 2 Sheets—Sheet 2.

Witnesses.
George H. Tilden
Helen Orford

Inventor.
Albert G. Davis

UNITED STATES PATENT OFFICE.

ALBERT G. DAVIS, OF SCHENECTADY, NEW YORK, ASSIGNOR TO GENERAL ELECTRIC COMPANY, A CORPORATION OF NEW YORK.

METHOD OF PRODUCING MULTIPHASE CURRENTS FROM SINGLE-PHASE CURRENTS.

SPECIFICATION forming part of Letters Patent No. 714,639, dated November 25, 1902.

Original application filed September 28, 1897, Serial No. 653,373. Divided and this application filed April 25, 1902. Serial No. 104,627. (No model.)

*To all whom it may concern:*

Be it known that I, ALBERT G. DAVIS, a citizen of the United States, residing at Schenectady, county of Schenectady, State of New York, have invented certain new and useful Improvements in Methods of Producing Multiphase Currents from Single-Phase Currents, (Case No. 2,842,) of which the following is a specification.

This application is a division of my prior application, Serial No. 653,373, filed September 28, 1897.

A number of phase-modifying devices are known in the art as it exists to-day in which multiphase current—as, for example, two-phase current—is produced from single-phase current by passing the single-phase current through one winding of a rotary transformer and generating in a second winding on said transformer a current dephased by the proper angle and carrying to translating devices current from the original source and also current from the second winding of the transformer. The objection to a device of this sort is that as the load varies the phase angle of the current in the second circuit also varies, so that it is impossible to procure a fairly symmetrical system of multiphase currents at all loads.

My present invention relates to a novel method of producing multiphase currents from a single-phase current; and it consists in generating a field of force by the single-phase current, generating thereby current in a relatively rotatable induced member, and thereby generating in secondary windings currents dephased from the original current.

The invention also comprises a novel method of correcting irregularities in phase displacement of the currents in a multiphase system by varying the phase of one or more of the impressed electromotive forces of the system and a method of regulating the phase displacement in a polyphase system which consists in varying the angular relation between the generating coils or windings.

I do not conduct the original alternating current to translating devices, but use it simply, so far as the multiphase part of the system is concerned, for the generation of the multiphase currents. The result of this arrangement is that any change in the load of the secondary system will at most produce a corresponding change in each of the secondary circuits and will not affect their relative phase angles.

Figure 4:
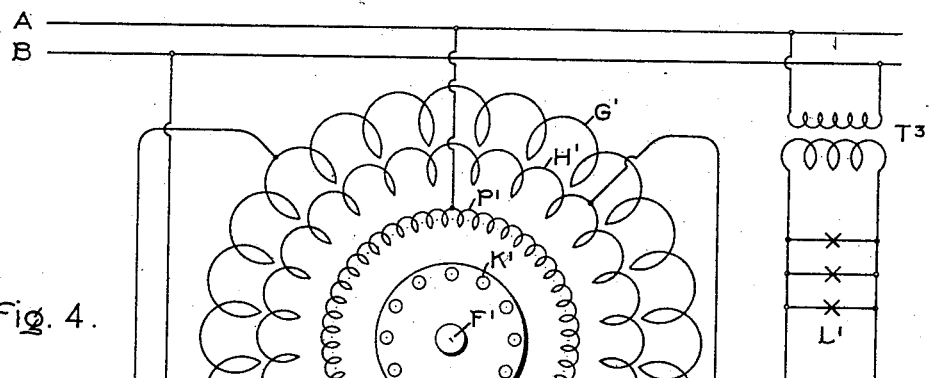

In the drawings attached to this specification, Figure 1 is an outline view of a phase-modifier by means of which my present invention may be practiced. Fig. 2 is a diagrammatic view of a system of distribution embodying my invention. Fig. 3 is a perspective showing another form which the improved phase-modifier may take, and Fig. 4 is a diagram of the connections of the structure shown in Fig. 2.

Referring more particularly to Fig. 2, I is a single-phase alternating-current generator having, if desired, a tension-raising transformer T. From this transformer there extend the usual mains A B, which in turn feed the tension-reducing transformer T'. From this transformer T' wires 1 2 lead through the switch C to the phase-modifying device. This phase-modifying device, which is shown in outline in Fig. 1 and diagrammatically in Fig. 2, consists of an inducing member D and an induced member E. The induced member, shown in this case as the rotor, consists of a short-circuited winding K, of any ordinary type, revolving upon the shaft F. The inducing member is wound with a primary winding connected directly to the leads 1 2. I have illustrated a phase-modifier as a four-pole machine or a machine with two rotating polar lines and have shown two separate primary coils P P connected in series and so wound as to produce similar poles, as indicated by the letters N S (N) (S) in Fig. 1. There are also two sets of secondary windings, each set comprising two coils G G and H H, respectively, the coils of each set being preferably connected in series. In Fig. 1 I have shown the primary coils P P connected in series to the terminals 1 2. The secondary coils are also connected in series in two sets, the coils G G having their terminals at 3 4 and the coils H H at 5 6. The coils G G and H H are displaced from the coils P P in opposite directions and each by an amount equal to one-eighth of the polar pitch. The said coils are therefore displaced from each other by one-quarter of the polar pitch. Since the phase-modifier, as shown, is a four-pole machine, one-quarter of the polar pitch corresponds to one-eighth of the circumference of the core upon which the coils are wound. In order that the actual displacement of the coils may be rendered more apparent, I have in Fig. 2 diagrammatically illustrated the phase-modifier as a two-pole machine having its two secondary windings displaced by one-eighth of the polar pitch (in this case one-eighth of the circumference) from the primary winding. The free terminals of the winding G are connected to the secondary mains 3 4, while the free terminals of the winding H are connected to the secondary mains 5 6. To these secondary mains are connected various translating devices, as the lamps L L and the motors M M'. The motor M is a two-phase motor of the induction type, while the motor M' is a three-phase synchronous motor excited by the direct-current exciter X and fed through the phasing transformer $T^2$.

A condenser J in series with the switch S is shunted across one of the secondary windings, as G.

The action of a machine thus constructed is as follows: In starting, the switches S and C are closed, and a current is admitted, through the switch C and the leads 1 2, to the primary winding P. This current generates a field of force, which induces current in the secondary windings G G H H, as well as in the winding K of the induced member E. The action of the condenser, which may obviously be replaced by any other phase-modifying device, is to dephase the currents flowing in the windings G and H sufficiently to produce a starting torque. This constitutes a convenient means for starting my phase-modifier; but it forms no part of my invention and may be replaced by any suitable starting device, or the machine may be started by hand. When the induced member E, which should preferably supply no mechanical load, but which should have a considerable moment of inertia, has attained a sufficient speed, the switch S may be opened, and the machine will run as a single-phase induction-motor. The winding P will then generate a stationary alternating four-pole field of force; but the reaction of the currents in the rotating induced member will transform this stationary field into a simple rotating four-pole field, and this rotating field cutting the windings G and H will induce currents therein differing in phase by an amount depending upon the relative positions of windings G, H, and P. In the form shown the windings G and H are displaced from the windings P in opposite directions and each by an amount equal to one-eighth of the polar pitch. It follows, therefore, that the currents in the windings G and H will be displaced from each other by ninety degrees and that this relative phase displacement will be independent of the transformer-lag, and therefore of the amount of load on the secondary. Multiphase currents will flow in the circuits 3 4 5 6 and will be supplied to the translating devices L M M'.

Obviously two of the secondary mains may be joined in one, as shown at 7, when an interconnected two-phase system will result.

Referring more particularly to the modifications shown in Figs. 3 and 4, A B are the single-phase mains, as before, connected to the inducing-winding P' upon the ring D'. Mounted upon the same bed-plate with the ring D' are two other rings U and V, while a single induced rotor E', wound with the short-circuited windings K', extends through the whole series of rings. The rings U and V are wound with the windings G' and H', which, as shown in Fig. 4, are connected, through the secondary mains 3' 4' 5' 6', to translating devices, such as the lamps L L and the two-phase motor $M^2$. It will be seen that the action of this machine is related to that of the machine just described somewhat as the action of the Stanley two-phase motor described in United States Patent No. 524,534, dated August 14, 1894, is related to that of the ordinary rotary-field two-phase motor. The primary winding P' induces currents in the induced windings K', which in turn induce currents in the secondary windings G' H'. Owing to the fact that the windings G' H' are angularly displaced from each other, they will have induced in them electromotive forces of different phases.

In any interconnected two-phase system—such, for example, as the system shown at 3' 7' 5', Fig. 3, and at 3 5 7, Fig. 2—the phases of the currents on the two sides tend to become displaced from their normal ninety-degree relation owing to the interconnection. When such displacement occurs in any two-phase system whatever, I correct it by varying the relative phases of electromotive forces impressed upon the two sides of the system. Various other conditions may occur which render such correction necessary, and my present invention includes a method applicable to any two-phase system for accomplishing this correction.

Referring to Fig. 3, it will be seen that the members U V, carrying the windings G' H', are capable of rotating upon the bed-plate. Pinions W W, controlled by crank-handles Y Y or in any other suitable way, are shown as meshing with teeth Z Z in the peripheries of the members U V. A slight rotation of either of the members by means of the crank-handle or otherwise will cause a change in the phase of the electromotive forces impressed upon the corresponding windings. It is obvious that when such rotation is required it is preferable from a mechanical point of view to mount the windings G' and H' upon separate members, as shown in Fig. 3; but I do not restrict myself to this arrangement.

I prefer also in all of my rotary phase-modifying devices to place a fly-wheel N upon the shaft of the rotor. The reason for this is as follows: It is well known that the energy of a single-phase alternating current is not constant, but varies from instant to instant, while the energy of a symmetrical multiphase current is constant from instant to instant. It follows from this that the transformer must be able to store energy and to return it, and it is for this reason that all phase-shifting devices depending merely on condensers and self-induction coils have been highly inefficient. In a phase-modifier of the rotating type this energy is stored mechanically in the rotating member, and the presence of a fly-wheel greatly assists the action. Power may be taken off at N, if desired, when the machine becomes a combined motor and phase-changer.

It is obvious that my method of regulating the phase displacement, which consists in shifting the angular position of one or more of the secondary windings, is applicable to various forms of phase-modifying devices different from those here shown.

I have shown in Fig. 2 a tension-raising transformer interposed between the primary mains and the phase-modifiers. It is obvious that this transformer may be dispensed with where the tension of the current on the mains is already such as to give a suitable tension on the secondary system. Where this is not the case, I may cause the machine to act as a transformer both of phase and tension and produce any desired voltage on the secondary system by suitably proportioning the primary and secondary windings. For example, I have shown in Fig. 4 a primary winding P′ of a large number of turns and secondary windings G′ H′ of a smaller number of turns, so that the voltage of the current on the secondary system will be lower than that on the primary system.

I have for the sake of simplicity illustrated the phase-modifying devices as generating two-phase current from single-phase current. It will, however, be evident that my method is not restricted to that use, but that it may be employed to effect any desired increase in the number of phases of an alternating current.

Although I have illustrated in this application certain specific forms of apparatus by means of which my present method may be practiced, it will of course be understood that the present invention is not dependent upon any particular form of apparatus for carrying it into effect.

What I claim as my invention, and desire to secure by Letters Patent of the United States, is—

1. The method of supplying multiphase translating devices from a single-phase source, which consists in generating, by means of an alternating current, a magnetic field in an inducing member, causing thereby relative rotation between said inducing member and a suitable induced member, generating thereby a plurality of dephased currents in secondary windings fixed with relation to the inducing member, and feeding the said currents to said translating devices.

2. The method of producing a dephased current from a single-phase current and regulating the phase displacement of the same, which consists in generating by the single-phase current a magnetic field in the inducing member, causing thereby relative rotation between said inducing member and a suitable induced member, and generating thereby in a secondary winding in inductive relation to said induced member, current dephased from the original current, and shifting the angular position of said secondary winding to vary the phase displacement of said dephased current.

3. The method of supplying multiphase translating devices from a single-phase source, which consists in generating, by means of an alternating current, a magnetic field in an inducing member, generating thereby current in an induced member capable of rotation relatively to said inducing member, generating thereby a plurality of dephased currents in secondary windings fixed with relation to the inducing member, and feeding the said currents to translating devices.

4. The method of producing multiphase currents from single-phase current, and of regulating the phase displacement of the same, which consists in generating a field of force by the single-phase current, generating thereby current in a relatively revoluble induced member, and thereby generating in secondary windings currents dephased from the original current, and changing the angular relation of the said secondary windings to vary the phase displacement of the said dephased currents.

5. The method of correcting irregular phase displacement of the currents in a polyphase system, which consists in varying the phase of one or more of the impressed electromotive forces of the system.

6. The method of regulating the phase displacement in a polyphase system, which consists in varying the angular relation between the generating-coils.

In witness whereof I have hereunto set my hand this 24th day of April, 1902.

ALBERT G. DAVIS.

Witnesses:
BENJAMIN B. HULL,
HELEN ORFORD.